(12) United States Patent
Voskuil et al.

(10) Patent No.: US 8,240,513 B2
(45) Date of Patent: Aug. 14, 2012

(54) FLUID DISPENSER WITH NESTED DISPLACEMENT MEMBERS

(75) Inventors: Mark Voskuil, Oegstgeest (NL); Jan Post, Sassenheim (NL); Mart Verschoor, Rijnsburg (NL)

(73) Assignee: Fluid Management Operations LLC, Wheeling, IL (US)

( * ) Notice: Subject to any disclaimer, the term of this patent is extended or adjusted under 35 U.S.C. 154(b) by 1178 days.

(21) Appl. No.: 12/054,093

(22) Filed: Mar. 24, 2008

(65) Prior Publication Data
US 2009/0236367 A1 Sep. 24, 2009

(51) Int. Cl.
*B67D 7/78* (2010.01)
*B67D 7/06* (2010.01)
*B67D 7/70* (2010.01)
*B67D 7/58* (2010.01)
*F04B 1/12* (2006.01)
*F01B 7/10* (2006.01)

(52) U.S. Cl. ............... 222/144; 222/144.5; 222/255; 222/380; 417/269; 417/470; 92/65

(58) Field of Classification Search ............ 222/380, 222/144, 144.5, 255, 265, 267, 275, 278, 222/280, 381, 252, 253, 336, 339, 340, 341; 417/470, 472, 269, 521; 92/65, 62, 63; 422/500, 422/505, 521; 436/148, 180
See application file for complete search history.

(56) References Cited

U.S. PATENT DOCUMENTS

| 862,867 | A | * | 8/1907 | Eggleston | 417/390 |
|---|---|---|---|---|---|
| 2,604,076 | A | * | 7/1952 | Trevaskis | 92/52 |
| 2,649,842 | A | * | 8/1953 | Caldwell et al. | 92/52 |
| 3,162,335 | A | * | 12/1964 | Kogan et al. | 222/212 |
| 3,275,042 | A | | 9/1966 | Strazdins | |
| 3,469,503 | A | * | 9/1969 | Halderman et al. | 92/62 |
| 4,036,309 | A | * | 7/1977 | Petreev et al. | 173/103 |
| 4,258,759 | A | * | 3/1981 | Achen | 141/100 |
| 4,966,308 | A | | 10/1990 | Strazdins | |
| 5,474,211 | A | * | 12/1995 | Hellenberg | 222/1 |
| 6,273,298 | B1 | * | 8/2001 | Post | 222/105 |
| 6,811,058 | B2 | * | 11/2004 | Voskuil et al. | 222/135 |
| 7,434,708 | B2 | * | 10/2008 | Voskuil et al. | 222/168.5 |
| 7,644,840 | B2 | * | 1/2010 | Held et al. | 222/135 |
| 7,654,416 | B2 | * | 2/2010 | Buining et al. | 222/144 |
| 2004/0060947 | A1 | * | 4/2004 | Papaikonomou | 222/144 |
| 2006/0175570 | A1 | * | 8/2006 | Held et al. | 251/315.03 |
| 2007/0289991 | A1 | * | 12/2007 | Jensen | 222/1 |

FOREIGN PATENT DOCUMENTS

GB 1 405 060 A 10/1990
WO WO 02/05698 A2 1/2002

OTHER PUBLICATIONS

International Search Report for related international application No. PCT/EP2009/058221, report dated Jul. 5, 2010.

* cited by examiner

*Primary Examiner* — Kevin P Shaver
*Assistant Examiner* — Stephanie E Williams
(74) *Attorney, Agent, or Firm* — Miller, Matthias & Hull LLP

(57) ABSTRACT

A dispenser for dispensing liquids including an inner displacement member nested in an outer displacement member. The inner member is moveable between two end positions within the outer member by an actuator. The actuator is arranged to move the outer displacement member into a dispensing position when the inner displacement member is in one of its end positions. The displacement members can be pistons and/or bellows.

17 Claims, 7 Drawing Sheets

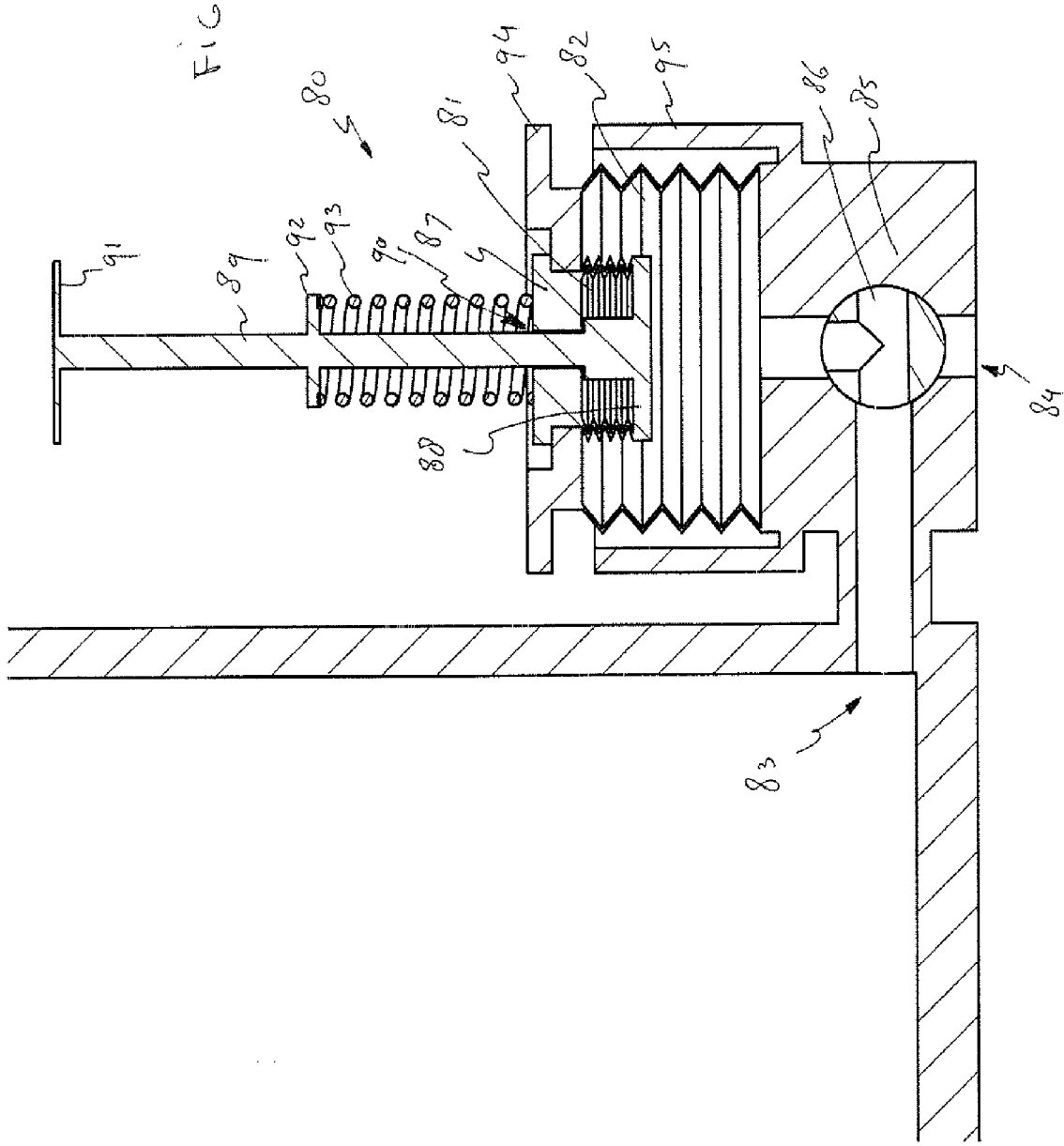

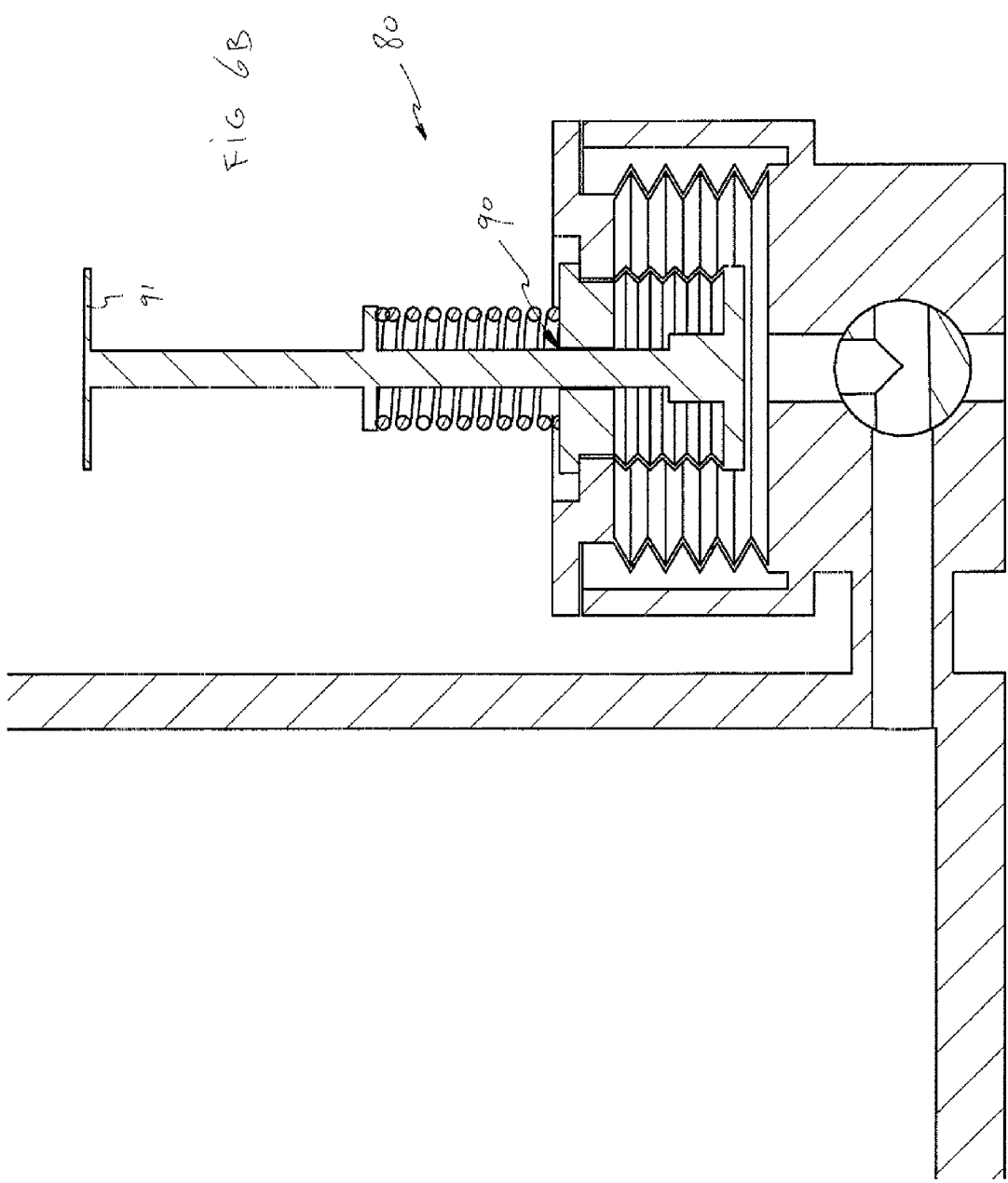

FLUID DISPENSER WITH NESTED DISPLACEMENT MEMBERS

BACKGROUND

1. Technical Field

Fluid dispensers are disclosed that comprise a piston in a piston chamber. The dispensers are particularly suitable for dispensing and metering viscous compositions such as pigment pastes, colorants, cosmetics, chemicals, paints or the like.

2. Description of the Related Art

Mixing compositions such as paint formulations requires dispensing of both large volumes of liquid as well as smaller quantities. Dispensers designed for dispensing the larger volumes have a relatively large piston diameter, which makes them suitable for dispensing large volumes, but not small volumes. Accordingly, the reproducibility and accuracy of the dispensing of small volumes using such large capacity dispensers is insufficient.

U.S. Pat. No. 4,964,534 discloses a double piston for a colorant dispenser with a small piston movable within a bore in a larger piston. The shaft of the small piston runs through the shaft of the larger piston.

A need exists for a fluid dispenser with accurate and reproducible metering when dispensing in variable volumetric ranges, which can easily and effectively cooperate with a regular operating module, e.g., of a colour mixing apparatus.

SUMMARY OF THE DISCLOSURE

A dispenser is disclosed that comprises an inner displacement member nested in an outer displacement member. The inner member is moveable between two end positions within the outer member by an actuator. The actuator is arranged to move the outer displacement member into a dispensing position when the inner displacement member is in one of its end positions.

This way, both pistons can be actuated using only a single piston shaft or rod. This allows a compact and robust construction which can for instance be actuated in an automated manner by an operating module. Accurate metering can be realized with varying volumetric ranges.

The displacement members can for example be pistons or bellows or a combination of a piston and a bellow.

In a particular embodiment, the displacement members include a first piston moveable within a piston chamber, and a second piston movable within a bore in the first piston between a retracted position and a dispensing position. The bore is in open communication with the piston chamber and the actuator is a shaft fixed to the second piston. A spring member biases the second piston to the retracted position within the bore in the first piston.

Optionally, the dispensing position of the first piston member is defined by an engagement member, such as a stop or shoulder in the first piston chamber. The distance between the retracted position and the dispensing position of the first piston member is less than the length of the shaft. When the first piston engages the engagement member, e.g. when it rests on a stop, the dispenser is in the starting position. With the valve member leaving the inlet open, moving the piston shaft upwardly draws the liquid into the piston chamber. With the valve member opening the outlet, the liquid can subsequently be dispensed while the piston is moved back to the starting position.

On the other hand, when the dispenser is in the starting position with the first piston resting on the stop and with the valve member leaving the outlet open, the second piston can be actuated by moving the piston shaft downwardly to dispense a small amount of liquid. Subsequently, the spring element will push back the second piston.

In a particular embodiment, the shaft can be provided with a seat for the spring member within the piston chamber and the second piston member is connected to the end of the shaft.

Optionally, a second spring member is used to bias the first piston member into the retracted position.

The disclosed dispensers can be used in various volumetric ranges. In a specific embodiment, the dispensed volume per stroke by the inner displacement member can for example be from about 1% to about 5% of the dispensed volume per stroke by the outer displacement member.

The piston shaft can for instance be provided with a seat for the spring member within the piston chamber.

In an alternative embodiment, a second spring member biases the first piston member to the retracted position. This way, the two spring members are in a serial arrangement. By pushing the piston shaft downwardly only a small amount of liquid is dispensed. If the piston shaft is pushed further, also the first piston is actuated and a large amount of liquid is dispensed.

The volume ratio of the dispensed volume per stroke by the second piston can for example be from about 1% to about 5% of the dispensed volume per stroke by the first piston.

The dispenser can for example be part of an apparatus for dispensing fluids comprising at least one canister operatively connected to the dispenser. Such an apparatus can for example be an apparatus having a plurality of canisters and corresponding dispensers placed on a turntable comprising driving means to rotate the turntable for positioning a selected dispenser in a position here it is operatively connected to a stationary operation module. Such an apparatus can for example be used as a color mixing or tinting device for preparing paint formulations or the like.

The dispenser can for example be actuated by driving means such as a stepper motor.

The respective parts of the dispenser, in particular the housings, can be made of any suitable material, e.g., a metal, such as stainless steel, of a polymer material, such as POM or PEEK.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 6A illustrates, schematically, another alternative embodiment;

FIG. 6B: shows the dispenser of FIG. 6B during dispensing.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
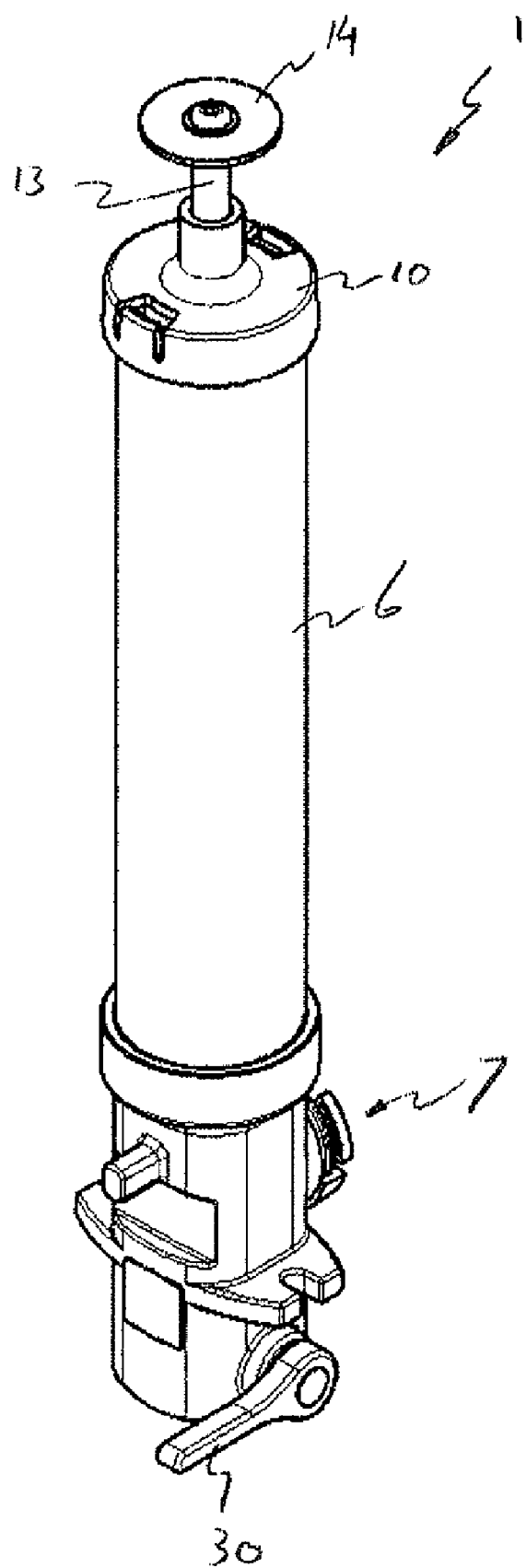
FIG. 1 is a perspective view of a disclosed pump dispenser.
Figure 2:
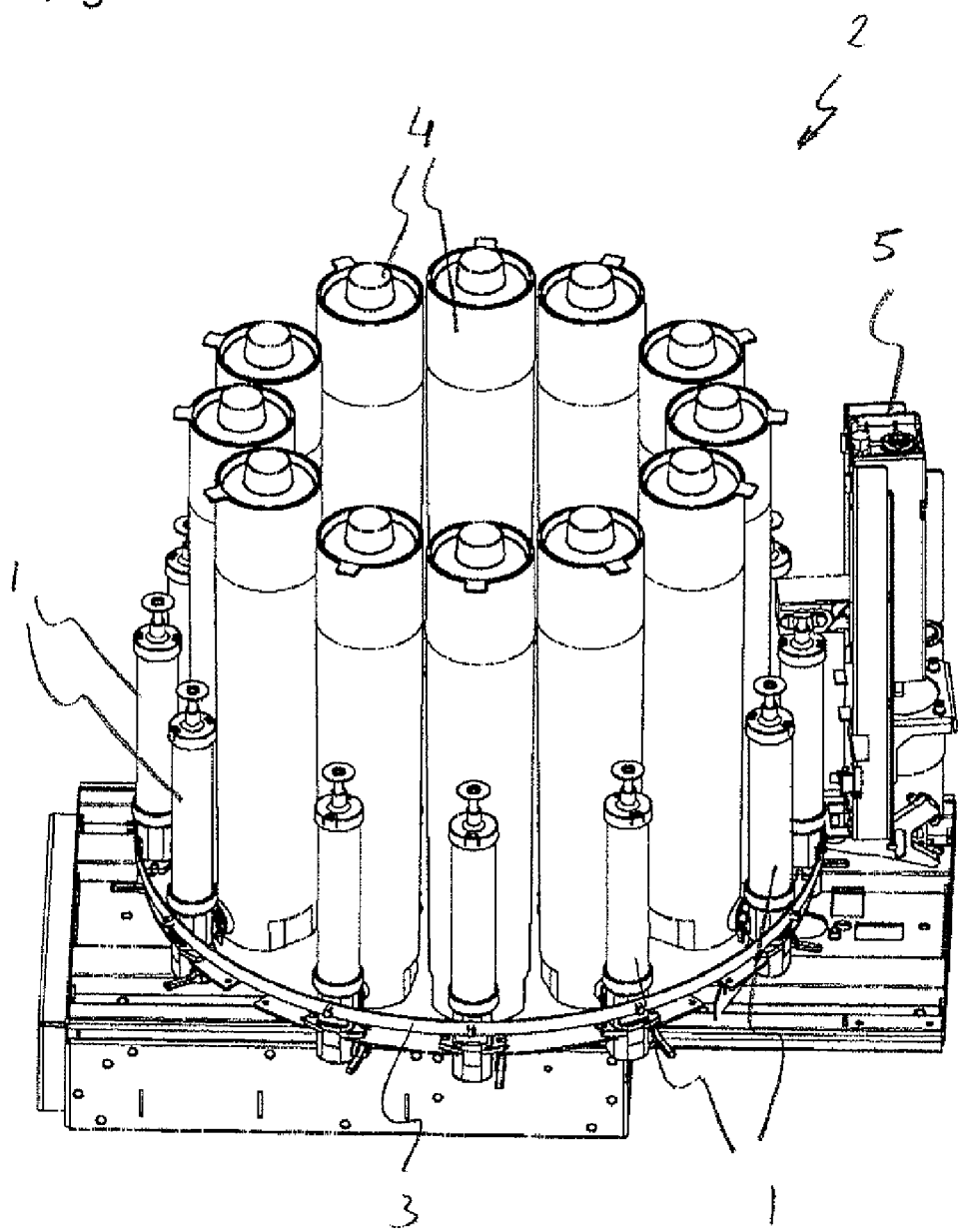
FIG. 2 is a perspective view of a turntable comprising a number of dispensers according to FIG. 1.

FIG. 1 shows a disclosed pump dispenser 1. The dispenser 1 can be used for dispensing viscous fluids, such as paints or pigment pastes, such as in color mixing assemblies as shown in FIG. 2. Such a color mixing assembly 2 includes a turntable 3, which is rotatable about a vertical axis by means of a drive (not shown) in order to rotate the turntable 1 between discrete positions.

On the turntable 3, there is mounted a plurality of pump dispensers 1. Each dispenser 1 is associated with a canister 4. When one of the canisters 4 is empty or nearly empty, it should be refilled by pouring fluid, such as a paint component, into it. A selected canister 4 can be rotated with its corresponding dispenser 1 to a stationary operating module 5. The operating module 5 can actuate the dispenser and a required amount of the selected fluid is dispensed. Subsequently, the turntable 3 can be rotated to position a next selected canister 4 in front of the operating module 5. These steps can be repeated until all fluid components in the required quantities are dispensed into a container to form the desired end mixture.

Figure 3:
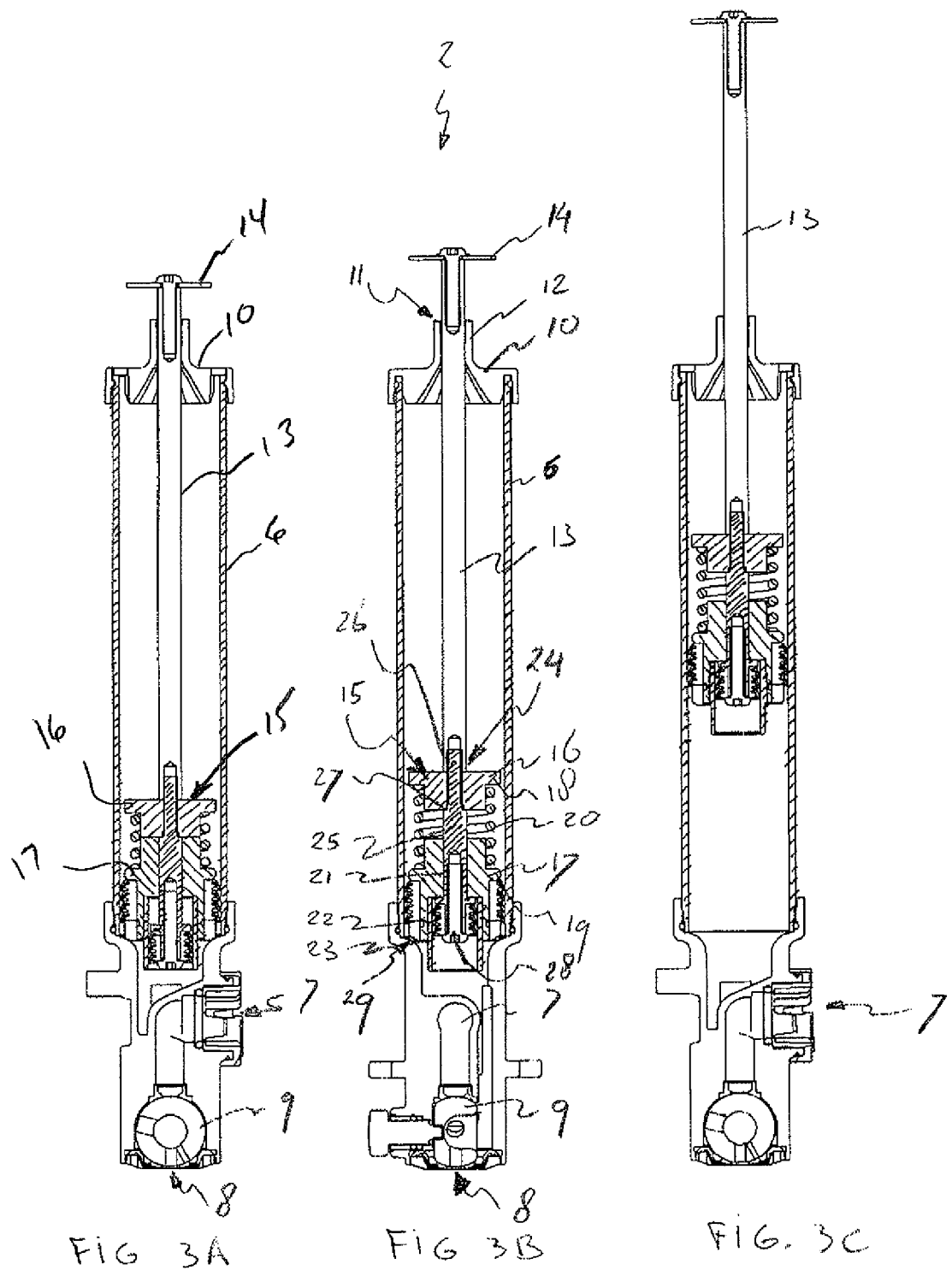
FIG. 3A is the dispenser of FIG. 1 in cross section with pistons in a small volume dispensing position.
FIG. 3B is a cross section of the dispenser of FIG. 1 in a rest position.
FIG. 3C is a cross section of the dispenser of FIG. 1 with retracted pistons.

FIGS. 3A, 3B and 3C illustrate the pump dispenser 1 in cross section. The plane of the cross section of FIG. 3B is perpendicular to the plane of the cross section of FIGS. 3A and 3C. The pump dispenser 1 comprises a cylindrical housing 6 with an inlet 7 and an outlet 8. Near the outlet 8, the pump dispenser 1 comprises a valve member 9 for selectively opening and closing off the inlet 7 and outlet 8 respectively, as described in more detail in FIGS. 4A and 4B.

The top end of the cylindrical housing 6 is closed off by a cap 10 with a central opening 11 surrounded by a collar 12. A shaft 13 extends through the central opening 11. At its end outside housing 6, the shaft 13 is provided with a flange 14. Flange 14 can be engaged by an actuator (not shown) adapted to move the piston shaft 13. At its other end inside the housing 6, the shaft 13 is provided with a piston 15 comprising an upper piston part 16 and a lower part 17, both provided with shoulders 18, 19 forming a seat for a pressure spring 20, biasing the two parts away from each other. The lower piston part 17 is provided with a central opening with an upper section 21 of smaller diameter and a lower section 22 of a larger diameter. Within the section 22 of larger diameter, the lower piston part 17 comprises an outwardly projecting cylinder 23. The upper piston part 16 is provided with an inner bore 24. A shaft extension part 25 comprises a screw threaded end 26 passing through the inner bore 24 in the upper piston part 16 and engaging an inner screw thread in the outer end of shaft 13. A shoulder 27 of the shaft extension part 25 presses the upper piston part 16 to the end of the shaft 13. A secondary piston 28 is screwed on the outer end of the shaft extension part 25, the inner bore of cylinder 23 of lower piston part 17 forming the corresponding piston chamber. The shaft extension part 25 is slidable within the inner bore of the lower piston part 17. The interior 30 of housing 6 is dimensioned to form a piston chamber for the piston 15.

FIG. 3B shows the dispenser 1 in its rest position, with the lower piston part 19 resting on a shoulder or stop 29 at the lower end of the housing 6. Starting from the rest position of the dispenser 1 as shown in FIG. 3B, the dispenser 1 can be actuated. If a large amount of paint is to be metered, shaft 13 is moved upwardly. With the valve member 9 opening the inlet 7, the desired amount of liquid is evacuated into the housing 6. The valve member is the turned to the position opening the outlet and closing off the inlet, as shown in FIG. 3C. The shaft is then pressed downwardly back to the start-position of FIG. 3B and the metered amount of liquid is dispensed via the outlet 8.

If only a small amount of liquid is to be metered and dispensed, the shaft is—starting from the start position of FIG. 3B—pushed downwardly, while the valve member 9 opens the outlet 8 and closes the inlet 7. After turning back the valve member 9 to the position closing off the outlet 8, the pressure spring 20 forces the upper piston part 16 back to its retracted position.

Figure 4:
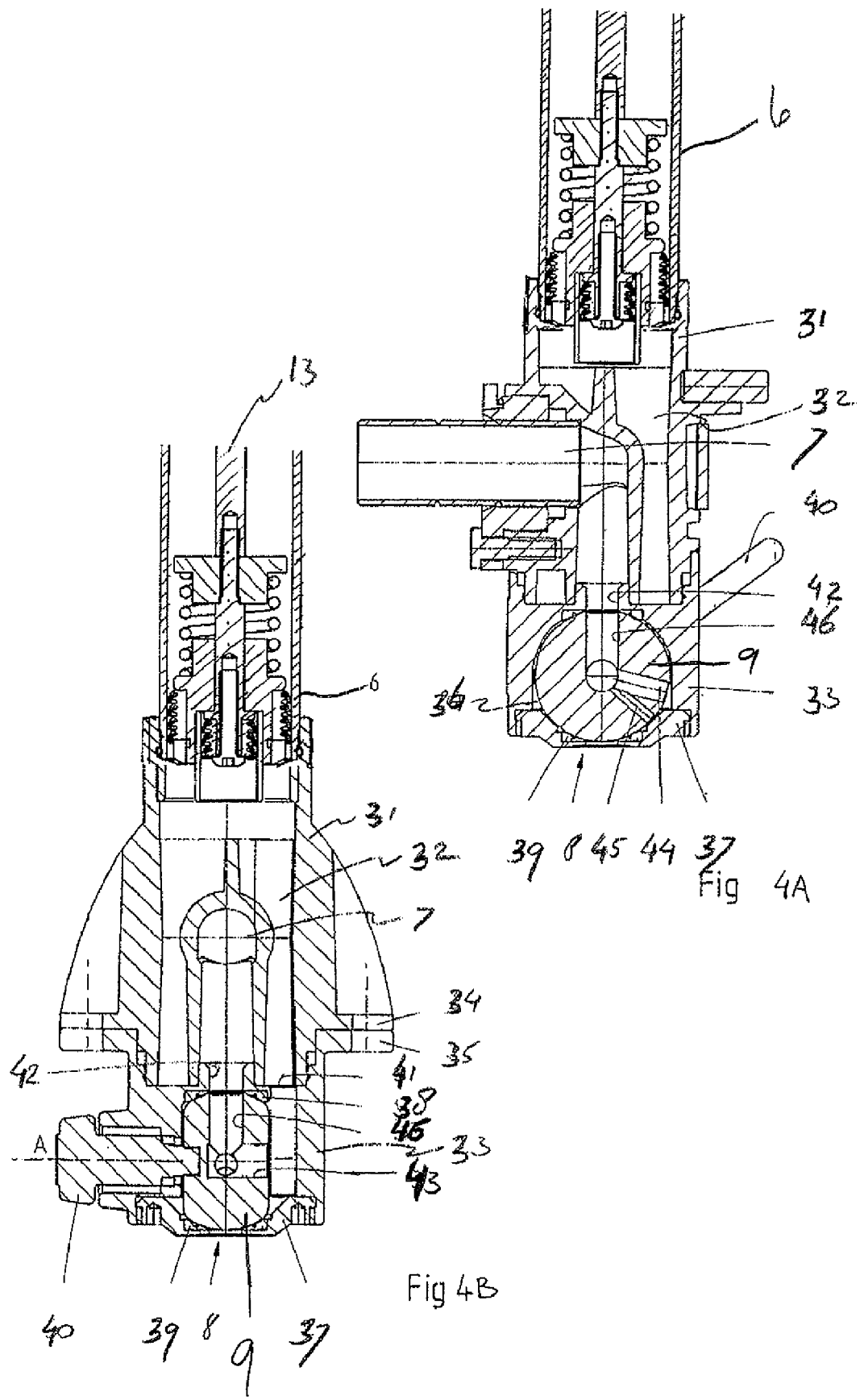
FIG. 4A is a detailed cross section of the valve assembly of the dispenser of FIG. 1.
FIG. 4B is a cross section perpendicular to the cross section of FIG. 4A.

FIGS. 4A and 4B show detailed cross-sections of the valve assembly 9 of the apparatus of FIG. 1. The cylinder 6 is mounted on the top part of a pump housing 31, which defines a cavity 32 in open connection with inlet channel 7 adapted to be in fluid communication with a canister 4 as shown in FIG. 2. The pump housing 31 is mounted on a valve housing 33 by means of respective flanges 34, 35. The valve housing 33 comprises an inner cavity 36 encasing the valve member 9. The cavity 36 is covered by a cover 37 attached to the lower side of the valve housing 33. Valve member 9 is fitted in the cavity 36 of the housing 12 between two annular bearings 38, 39. The valve member 9 is actuated by means of a lever 40. The cavity 36 in the valve housing 33 is limited at its upper part by a first opening 41, through which the cavity 36 communicates with the cavity 32 of the pump housing 31. The valve housing 33 further includes the outlet opening 8 in its bottom part and a third opening 42 which communicates with the inlet channel 7 in the pump housing 31.

The valve member 9 includes a first channel 43 (FIG. 4B) communicating with the first opening 41 in the housing 33. It further includes one or more radially extending outlet channels 44, 45 and an inlet channel 46 (FIG. 4A).

In FIGS. 4A and 4B, the inlet channel 46 of the valve member 9 is in registry with the third opening 42 of the valve housing 33 and thus with the inlet channel 7. As a result, the connected canister 4 communicates with the cavity 32 in the pump housing 31 and the cylinder 6 by way of the inlet 7, channel 42, channel 46, channel 43 and opening 41. In this position, the cavity 32 and cylinder 6 now can be filled with a fluid from the canister by moving the shaft 13 upwards. As soon as an appropriate amount of fluid is taken in, the valve member 9 can be rotated to the desired dispensing position. The shaft 13 can be moved downwards to dispense a desired or predetermined amount from the opening 8.

FIGS. 5A-5E show schematically five stages of use of an alternative dispenser. The dispenser 61 comprises a cylindrical housing 62, a first piston member 63 with an inner bore 64 which is coaxial with the cylinder 62. The inner bore 64 has a narrowed outlet opening 65 at its lower end and a narrowed passage 66 for a piston shaft 67 at the upper end. The piston shaft 67 comprises a second piston member 68 located within the inner bore 64 which functions as a piston chamber for the second piston member 68. The piston shaft 67 further comprises a flange 69 at its top end for engagement with an actuator. Between the flange 69 and the first piston member 63, the shaft 67 is provided with a shoulder 70 which forms the seat for a first pressure spring 71 forcing apart shoulder 70 and first piston member 63. The cylindrical housing 62 comprises a bottom 72 with an outlet opening 73. A second pressure spring 74 forces the first piston member 63 away from the bottom 72. The stiffness of the second spring 74 is considerably higher than the stiffness of the first spring 71. Metering of a small amount of liquid is effected by a limited displacement of the shaft 67 against the action of the first spring 71.

Figures 5, 5A, 5B, 5C, 5D, 5E:
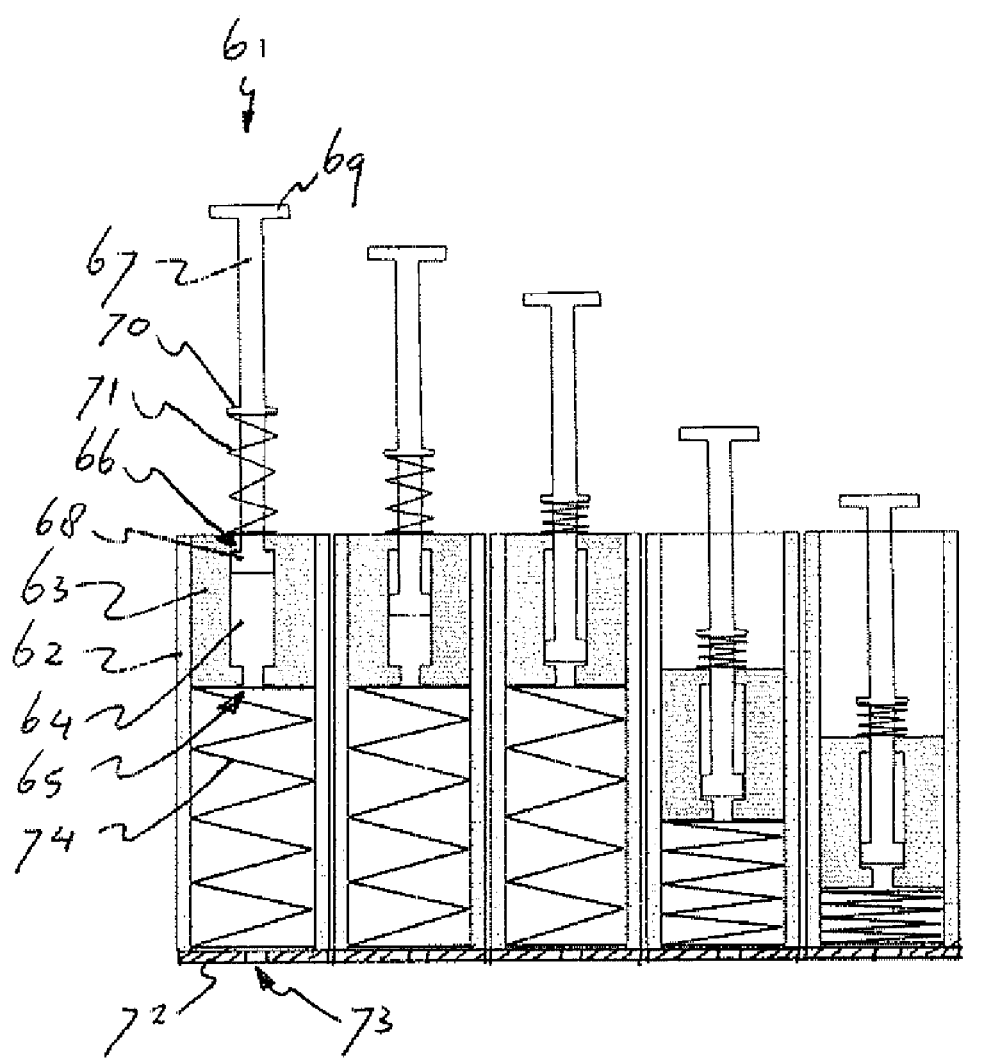
FIG. 5 illustrates, schematically, an alternative embodiment.

As shown in FIGS. 5B and 5C, the second piston member 68 slides within the inner bore 64 of the first piston member 63 from the retracted position in FIG. 5A to the dispensing position in FIG. 5C. Dispensing of a larger amount is effected by a larger displacement of the shaft 67 against the action of both the first and second spring 71, 74. As shown in FIGS. 5D and 5E, the first piston member 63 moves in the direction of the bottom 72, dispensing the large amount of liquid via the outlet opening 73.

FIGS. 6A and 6B show a dispenser 80 comprising an inner bellow 81 nested in an outer bellow 82. The dispenser comprises an inlet 83 and an outlet 84. A valve housing 85 encases a three way valve 86 which can be turned from an inlet position (as shown) to an outlet position connecting the outlet 84 to the interior of the outer bellow 82. The inner bellow 81 is confined by an upper plate 87 and a bottom plate 88. An actuator shaft 89 runs slidable through an opening 90 in the upper plate 87. At its end within the inner bellow 81 the shaft 89 is connected to the bottom plate 88. At its other end, the shaft 89 comprises a flange 91. Between the flange 91 and the upper plate 87 the shaft 89 comprises a coaxial annular seat 92 for a pressure spring 93 forcing apart the upper plate 87 and the seat 92. This way, the pressure spring 93 biases the inner bellow 81 into its retracted, compressed position.

At its lower side the outer bellow 82 is confined by the valve housing 85. At its top side it is confined by a top plate 94. A cylindrical wall 95 surrounding the outer bellow 82 defines the lower limit of the stroke top plate 94 can make.

Starting from the position shown in FIG. 6A, liquid can be dispensed by turning the valve member 86 to the position opening the outlet 84. A large amount of liquid is dispensed by pushing the shaft 89 downwardly until the top plate 94 abuts the wall 95. If a smaller amount of liquid needs to be dispensed, the shaft 89 is pushed further against the action of pressure spring 93, thus unfolding inner bellow 81 and forcing liquid from the interior of outer bellow 82 to the outlet, as shown in FIG. 6B.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A dispenser comprising:
a chamber accommodating an inner displacement member nested within a bore disposed in an outer displacement member, the bore being in communication with the chamber,
the inner displacement member being moveable between a retracted position and a dispensing position within the bore of the outer displacement member by a shaft,
the shaft being coupled to the inner displacement member and the outer displacement member,
both the inner and outer displacement members being slidable within the chamber, the outer displacement member being slidable between a retracted position and a dispense position,
the shaft being arranged to move the outer displacement member into its dispensing position when the inner displacement member is in its dispensing position,
a first spring member biasing the inner displacement member towards its retracted position, and
a second spring member biasing the outer displacement member towards its retracted position.

2. The dispenser according to claim 1 wherein at least one of inner and outer displacement members is a piston.

3. A dispenser comprising:
an inner displacement member nested in an outer displacement member, the inner displacement member being moveable between two end positions within the outer displacement member by an actuator, the actuator being arranged to move the outer displacement member into a dispensing position when the inner displacement member is in one of its end positions,
wherein at least one of inner and outer displacement members is a piston, and
wherein the outer displacement member comprises a first piston movable within a piston chamber,
the inner displacement member comprises a second piston movable within a bore disposed in the first piston, the second piston movable between a retracted position and a dispensing position,
the bore being in open communication with the piston chamber,
the actuator comprising
a shaft fixed to the second piston,
a spring member biasing the second piston to the retracted position within the bore disposed in the first piston, and
wherein the shaft is provided with a seat for the spring member within the piston chamber and the second piston member is connected to the end of the shaft.

4. The dispenser according to claim 3 wherein the dispensing position of the first piston member is defined by an engagement member in the first piston chamber and wherein the distance between the retracted position and the dispensing position of the first piston member is less than a length of the shaft.

5. The dispenser according to claim 1 wherein the shaft is provided with a seat for the spring member within the chamber and the inner displacement member is connected to the end of the shaft.

6. The dispenser according to claim 4 wherein the shaft is provided with a seat for the spring member within the piston chamber and the second piston member is connected to the end of the shaft.

7. The dispenser according to claim 3 further comprising a second spring member that biases the first piston member to its retracted position.

8. The dispenser according to claim 1 wherein at least one of the inner and outer displacement members is a bellow.

9. The dispenser according to claim 2 wherein at least one of the inner and outer displacement members is a bellow.

10. The dispenser according to claim 1 wherein the dispensed volume per stroke by the inner displacement member ranges from about 1% to about 5% of a dispensed volume per stroke by the outer displacement member.

11. An apparatus for dispensing fluids comprising:
an inner displacement member nested in an outer displacement member, the inner displacement member being moveable between two end positions within the outer displacement member by an actuator, the actuator being arranged to move the outer displacement member into a dispensing position when the inner displacement member is in one of its end positions, further comprising a plurality of canisters operatively connected to a dispenser, and wherein the canisters and the corresponding dispensers are placed on a turntable comprising a driving means to rotate the turntable for positioning a selected dispenser in a position here it is operatively connected to a stationary operation module.

12. The dispenser according to claim 2 wherein the dispensed volume per stroke by the inner displacement member ranges from about 1% to about 5% of a dispensed volume per stroke by the outer displacement member.

13. An apparatus for dispensing fluids comprising:

an inner displacement member nested in an outer displacement member, the inner displacement member being moveable between two end positions within the outer displacement member by an actuator, the actuator being arranged to move the outer displacement member into a dispensing position when the inner displacement member is in one of its end positions, wherein at least one of inner and outer displacement members is a piston, and further comprising a plurality of canisters operatively connected to a dispenser, and wherein the canisters and the corresponding dispensers are placed on a turntable comprising a driving means to rotate the turntable for positioning a selected dispenser in a position here it is operatively connected to a stationary operation module.

14. The dispenser according to claim 3 wherein the dispensed volume per stroke by the inner displacement member ranges from about 1% to about 5% of a dispensed volume per stroke by the outer displacement member.

15. An apparatus for dispensing fluids comprising:

an inner displacement member nested in an outer displacement member, the inner displacement member being moveable between two end positions within the outer displacement member by an actuator, the actuator being arranged to move the outer displacement member into a dispensing position when the inner displacement member is in one of its end positions, wherein at least one of inner and outer displacement members is a piston, wherein the outer displacement member comprises a first piston movable within a piston chamber, the inner displacement member comprises a second piston movable within a bore disposed in the first piston, the second piston movable between a retracted position and a dispensing position, the bore being in open communication with the piston chamber, the actuator comprising
a shaft fixed to the second piston,
a spring member biasing the second piston to the retracted position within the bore disposed in the first piston, further comprising a plurality of canisters operatively connected to a dispenser, and wherein the canisters and the corresponding dispensers are placed on a turntable comprising a driving means to rotate the turntable for positioning a selected dispenser in a position here it is operatively connected to a stationary operation module.

16. The dispenser according to claim 4 wherein the dispensed volume per stroke by the inner displacement member ranges from about 1% to about 5% of a dispensed volume per stroke by the outer displacement member.

17. An apparatus for dispensing fluids comprising:

a plurality of canisters operatively connected to the dispenser according to claim 4, and wherein the canisters and the corresponding dispensers are placed on a turntable comprising driving means to rotate the turntable for positioning a selected dispenser in a position here it is operatively connected to a stationary operation module.

* * * * *